United States Patent [19]

Zimmerer

[11] Patent Number: 4,522,511
[45] Date of Patent: Jun. 11, 1985

[54] METHOD AND APPARATUS FOR MEASURING RADIANT ENERGY

[75] Inventor: Robert W. Zimmerer, Port Angeles, Wash.

[73] Assignee: Scientech, Inc., Boulder, Colo.

[21] Appl. No.: 417,283

[22] Filed: Sep. 13, 1982

[51] Int. Cl.³ .......................... G01J 5/12; G01K 17/20
[52] U.S. Cl. ........................................ 374/32; 250/341
[58] Field of Search ............... 374/112, 179, 181, 135, 374/208, 32, 39, 29, 13, 10; 136/204, 224; 165/32

[56] References Cited

U.S. PATENT DOCUMENTS

| | | | |
|---|---|---|---|
| 2,900,816 | 8/1959 | Anderson | 374/10 |
| 2,984,077 | 5/1961 | Gaskill | 136/204 X |
| 3,238,777 | 3/1966 | Wald | 374/135 X |
| 3,313,154 | 4/1967 | Bruce | 374/32 |
| 3,383,919 | 5/1968 | Marcy et al. | 374/135 |
| 3,467,175 | 9/1969 | O'Connor | 165/32 X |
| 3,473,382 | 10/1969 | Tabeling | 374/13 X |
| 3,487,685 | 1/1970 | Shifrin | 374/32 |
| 3,607,445 | 9/1971 | Hines | 136/225 |
| 3,671,329 | 6/1972 | Huff | 374/181 X |
| 3,939,706 | 2/1976 | Pinson | 374/32 |
| 4,043,200 | 8/1977 | Finney | 165/11 R X |
| 4,276,441 | 6/1981 | Wilson | 136/225 X |

OTHER PUBLICATIONS

"Radiation Intensities and Heat Transfer by Radiation in Boiler Furnaces", ASME Transactions, vol. 58, 1936, pp. 117–122.

"Absolute Water Flow Calorimeter for the Measurement of Intense Beams of Radiant Energy", A. B. Willoughby, Jul. 1954, pp. 667–670, The Review of Scientific Instruments, V 25, No. 7.

Primary Examiner—Daniel M. Yasich
Attorney, Agent, or Firm—O'Rourke & Harris

[57] ABSTRACT

Method and apparatus for measuring radiant energy, particularly relatively high energy levels of coherent radiation, in which the energy impinges upon an absorber surface, the energy transferred from the absorber surface to a fluid coolant in thermal association with the absorber surface, and the energy carried away by the coolant measured by means of a temperature difference measuring device, preferably a thermopile, positioned in thermal contact with a portion of the inlet leg of the coolant conduit and the outlet leg thereof, in order that high energy levels may be measured at a cool absorber surface while flowing relatively small amounts of heat energy through the temperature difference measuring means.

4 Claims, 5 Drawing Figures

METHOD AND APPARATUS FOR MEASURING RADIANT ENERGY

BACKGROUND OF THE INVENTION

1. Field of the Invention

The present invention relates generally to power measurement devices for radiant energy, particularly to power measurement devices and methods for use with coherent energy at relatively high power levels.

2. Related Art

Measurement of radiant energy has reached its most sophisticated and advanced levels with reference to laser power measurement. Typically such devices involve an absorber, which may be a flat plate absorbent at the wave length of the coherent radiation, or at somewhat higher power levels or more dense beams, a glass plate to provide a volume absorption of the laser beam. In the event that the energy density is such as to damage flat plate absorbers, either surface or volume types, it has been proposed to distribute the energy over an even greater surface, such as by obliquely directing the energy beam into a tube of an internal finish which only partially absorbs the energy such as to reflect, bounce and scatter the energy down the tube and diffuse the energy being absorbed at any given portion of the tube.

Typically, the energy is determined by conducting the absorbed energy in the form of sensible heat to a heat sink, air cooled in the case of relatively low power levels, and water cooled at higher power levels. The energy is thus measured by flowing the sensible heat through the energy measuring means. Such means include thermopiles, which are desirable for the zero heat flow characteristics, or other temperature sensing devices positioned between the absorber and the heat sink. Given the nature of the heat measuring device across or through which sensible heat energy flow is measured, it must be recognized that the heat measuring device retards heat flow from the absorber to the heat sink. This, in the case of high energy levels, causes the absorber to become heated and reradiate energy which is lost to the measurement. Also, great amounts of energy must flow through the heat measuring device. At relatively high energy levels, it has been found that flowing great amounts of sensible heat through the heat energy measurement device is quite troublesome in that, for instant in the case of the desirable thermopile arrangement, great numbers of thermocouples must be provided at substantial expense to accomodate the high energy flow, which may be in the order of thousands of watts. Also, when in direct contact with the absorber as is conventional, the heat flow through the temperature difference measuring means is not necessarily evenly distributed across relatively large areas of thermopiles, and flow through limited areas may be destructive to the measuring devices. Accordingly, it has been a usual practice to use less desirable components, i.e., a pair of independent temperature sensing devices with possibly non-identical characteristics, and to operate the absorber at elevated temperatures with the possibility of energy re-emission compromising the accuracy of the measurement.

In instances of devices with difficiency requirements and purposes, cooling fluid temperatures at the inlet and outlet portions have been measured to determine energy loss. However, this concept does not address or suggest the requirements and advantages of a cool absorber when measuring radiant energy.

SUMMARY OF THE INVENTION

The present invention provides a heretofore unavailable improvement over previous laser power measurement devices and methods, comprises an absorber of any of the various conventional types having thereon a conduit in close thermal contact, i.e. without interposed heat measuring devices, and adapted to carry heat directly from the absorber to a coolant flowed through the conduit. Specific measurements are made at a temperature difference measuring device positioned between the inlet and outlet leg of the coolant, preferably by a thermopile, whereby the heat absorbed at the absorber may be determined as a function of the temperature difference between the coolant in the inlet leg of the conduit and the heated coolant in the outlet leg of the conduit. This arrangement allows the absorber to operate at a minimum temperature and avoids the need for large heat flux measuring devices.

DETAILED DESCRIPTION OF THE INVENTION

Figure 1:
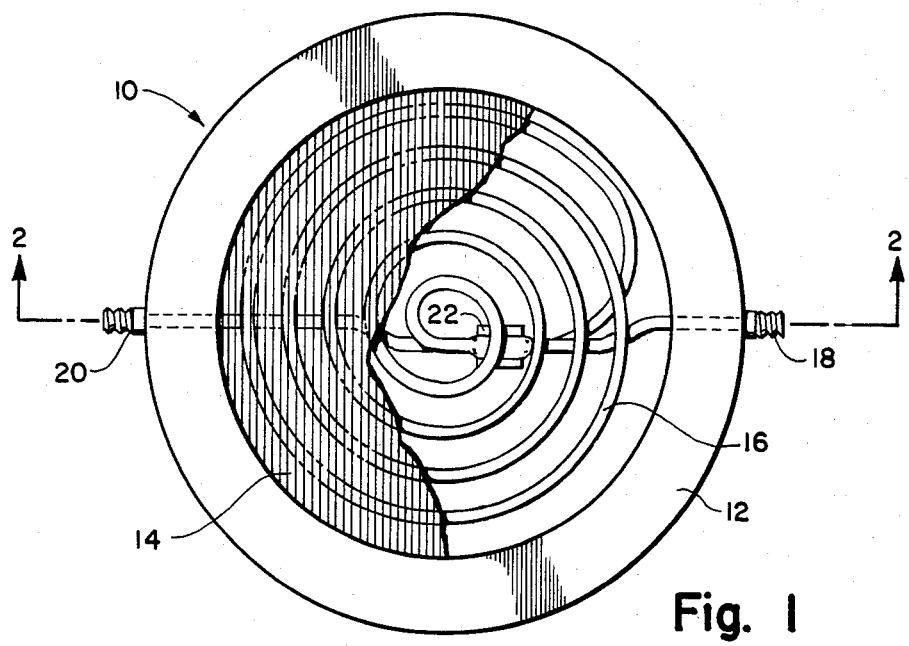
FIG. 1 is a partially cut away frontal view of an apparatus in accord with the instant invention.

Turning now to the drawings, wherein like components are designated by like reference numerals throughout the various figures, a power meter device according to a first embodiment of the present invention is illustrated in FIG. 1 and generally designated by reference numeral 10. Power meter 10 includes a housing 12 carrying therein an absorber 14, illustrated as a surface absorber, which in turn is in thermal contact with adjacent conduit 16 adapted to carry a coolant therethrough. Inlet fitting 18 and outlet fitting 20 are provided on the inlet and outlet legs respectively of conduit 16 to accomodate coolant flow therethrough. Coolant flow may be open loop, i.e., from a tap or other source of water (not shown) to a drain (not shown). Alternatively, coolant flow may be closed loop through, for instance, a radiator device (not shown) to remove heat through heat exchange. A single flow path as shown, may be replaced with multiple parallel paths.

Figure 2:
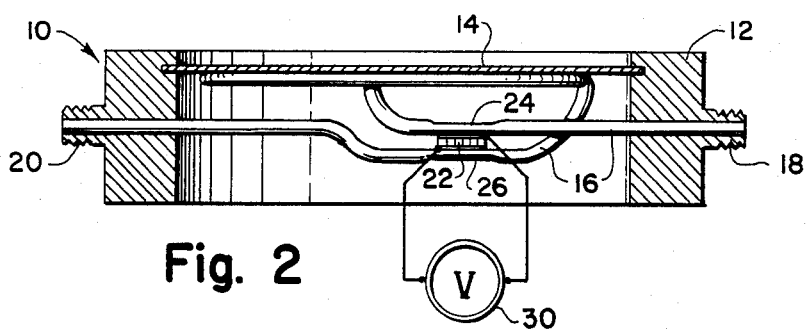
FIG. 2 is a top view along section line 2-2 of the apparatus of FIG. 1.

As is perhaps shown more clearly in FIG. 2, temperature difference measuring device 22, preferably a thermopile component utilizing Peltier effect junctions, is positioned between the inlet and outlet legs of conduit 16 and in thermal contact with each. Voltmeter 30, connected across temperature difference measuring device 22 is preferably employed to measure the voltage developed. Alternatively, various known bridge circuitries utilizing thermistors or other components that vary their electrical characteristics in response to temperature may be employed.

In operation, contrary to previously known power meters for relatively high powered lasers, the laser beam impinges upon absorber 14, converted thereat to sensible heat which is immediately conducted to the coolant carried in conduit 16. In this manner absorber 14 is cooled most efficiently. As a result of the rise in temperature of the coolant within conduit 16, a temperature differential is generated across measuring device 22, thereby generating, in the preferred embodiment, a voltage indicative of the heat absorbed from absorber 14, while permitting effective and efficient transfer of heat from absorber plate 14. In such a manner high power lasers or other radiation beams may be converted into sensible heat and the heat quantity measured without flowing the entire heat energy across or through the temperature measuring device.

Figure 3:
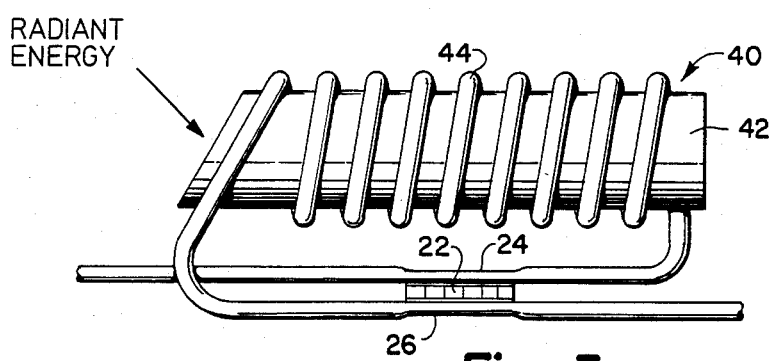
FIG. 3 is a side view of yet another embodiment of the instant invention.

An alternative power meter 40 is illustrated in FIG. 3. As shown, a tube 42 open at one end is wrapped with conduit 44. The interior of tube 42 is somewhat reflective of the radiation to be measured, ninety percent or higher at greater power levels. Accordingly, when a beam is obliquely directed into tube 42, it will bounce from wall to wall and be diffused thereby spreading the energy content over substantial areas of the interior of tube 42. Adjacent conduit 44, when coolant is flowed therethrough, will transfer the heat energy from tube 42 to the coolant as described with reference to the embodiment to FIGS. 1 and 2. Again, conduit 46 includes inlet and outlet legs with, preferably, flattened portions 24 and 26 respectively formed therein to afford excellent thermal contact with temperature difference measuring device 22. The power meter device 40 of FIG. 3 is particularly useful for measuring the power of relatively high power laser beams as a result of the beam entrapment and diffusion over the interior of tube 42. Such beam entrapment and diffusion is in itself known.

Figure 4:
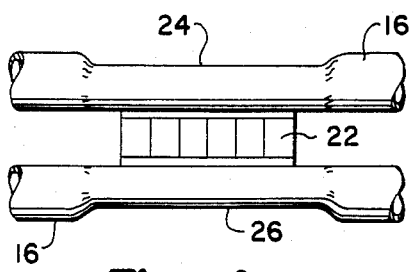
FIG. 4 and FIG. 5 are orthogonal views illustrating the details of the preferred embodiment mounting of the temperature sensing device at the legs of the conduit.
Figure 5:
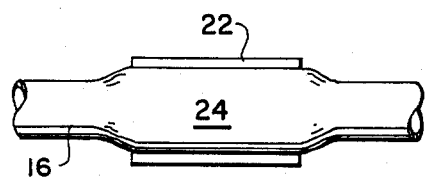

The details of the preferred arrangement of mounting temperature difference measuring device 22 are set forth in FIGS. 4 and 5. As shown, the inlet leg of conduit 16 includes a flattened portion 24 which is soldered to a metalized surface of temperature difference measuring device 22 while a similar arrangement exists with regard to the flattened portion 26 of the outlet leg of conduit 16. The particular arrangement is essentially the same as used in the embodiment of FIGS. 1 and 2 for that of FIG. 3.

In summary, the instant invention avoids the heretofore standard approach of flowing heat directly from an absorber configuration to a heat sink through a heat flux measuring arrangement. Instead, the heat is directed from the absorber to coolant in a conduit without interposing a measuring device therebetween. A temperature difference measuring device is provided between the inlet and outlet legs of the conduit in order that much less sever energy loads need be measured by the temperature difference measuring device. In this manner, relatively high power levels, i.e., on the order of several thousand watts on a continuous basis, may be accomodated and measured with reproducable accuracy. In addition to permitting more effective and efficient measurement of high power levels, the cost of such measurement is diminished in that a small temperature difference measuring component may be employed, while results are enhanced in that the temperature on either side of the temperature difference measuring device may be conveniently constant, while more conventional devices tend to be much hotter in the area in which the beam impinges upon the absorber.

Although only limited preferred embodiments of this invention have been illustrated and described, it is anticipated that various changes and modifications will be apparent to those skilled in the art, and that such changes may be made without departing from the scope of the invention as defined by the following claims.

I claim:

1. In a fluid cooled radiant energy measuring device having an absorber structure for receiving and absorbing the radiant energy, and a coolant system including a coolant conduit having inlet and outlet legs and adapted to flow a coolant therethrough to carry away the absorbed energy, the improvement comprising:

the coolant conduit and the absorber structure being in thermal contact; and a plurality of Peltier effect junctions with opposite sides of the junctions in thermal contact with the inlet leg and the outlet leg respectively of the coolant conduit, whereby the absorber structure will be effectively cooled by thermal contact with the coolant conduit, and the radiant energy measured by the Peltier effect device to determine the radiant energy falling on the absorber structure.

2. A power measuring device as set forth in claim 1 in which the absorber structure comprises the internal surface of a tube open at least one end thereat which said internal surface is at least partially reflective of the radiant energy being measured.

3. A method for measuring radiant energy power comprising:

directing the radiant energy to an absorption structure to absorb the radiant energy and convert such energy to sensible heat;

transferring the radiant energy generated sensible heat from the absorption structure to a fluid coolant carried in a coolant conduit that is in direct thermal contact with the absorption structure;

measuring the temperature difference between the inlet leg of the conduit and the outlet leg, by means of a Peltier effect device positioned with opposite sides of the junction in thermal contact between the inlet and outlet legs of the coolant conduit, which temperature difference is a function of the sensible heat flowed from the absorption structure to the coolant; and generating a Peltier effect electrical signal as a function of the temperature difference between the inlet and outlet legs of the conduit indicative of the energy absorbed at the absorption surface.

4. A method for measuring radiant energy power as set forth in claim 3 in which the absorption structure comprises a hollow tube open at one end with the radiant energy directed obliquely into the one open end of the tube and being reflected in part and being absorbed in part along the internal surface of the tube, and in which the coolant conduit is positioned immediately adjacent the outer surface of the tube.

* * * * *